Figure 5:
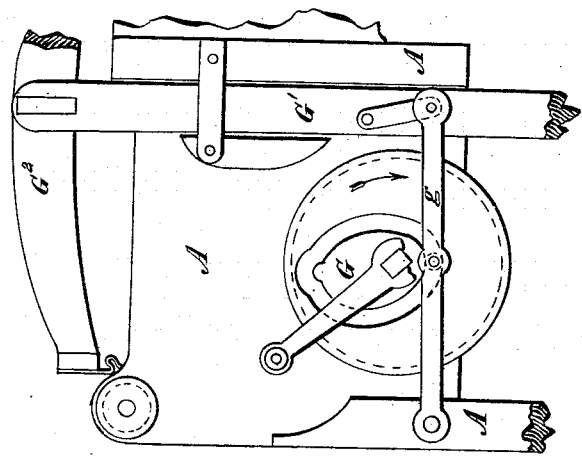

6 Sheets--Sheet 1.
T. W. GRINTER.
Paper-Bag Machine.
No. 164,548. Patented June 15, 1875.
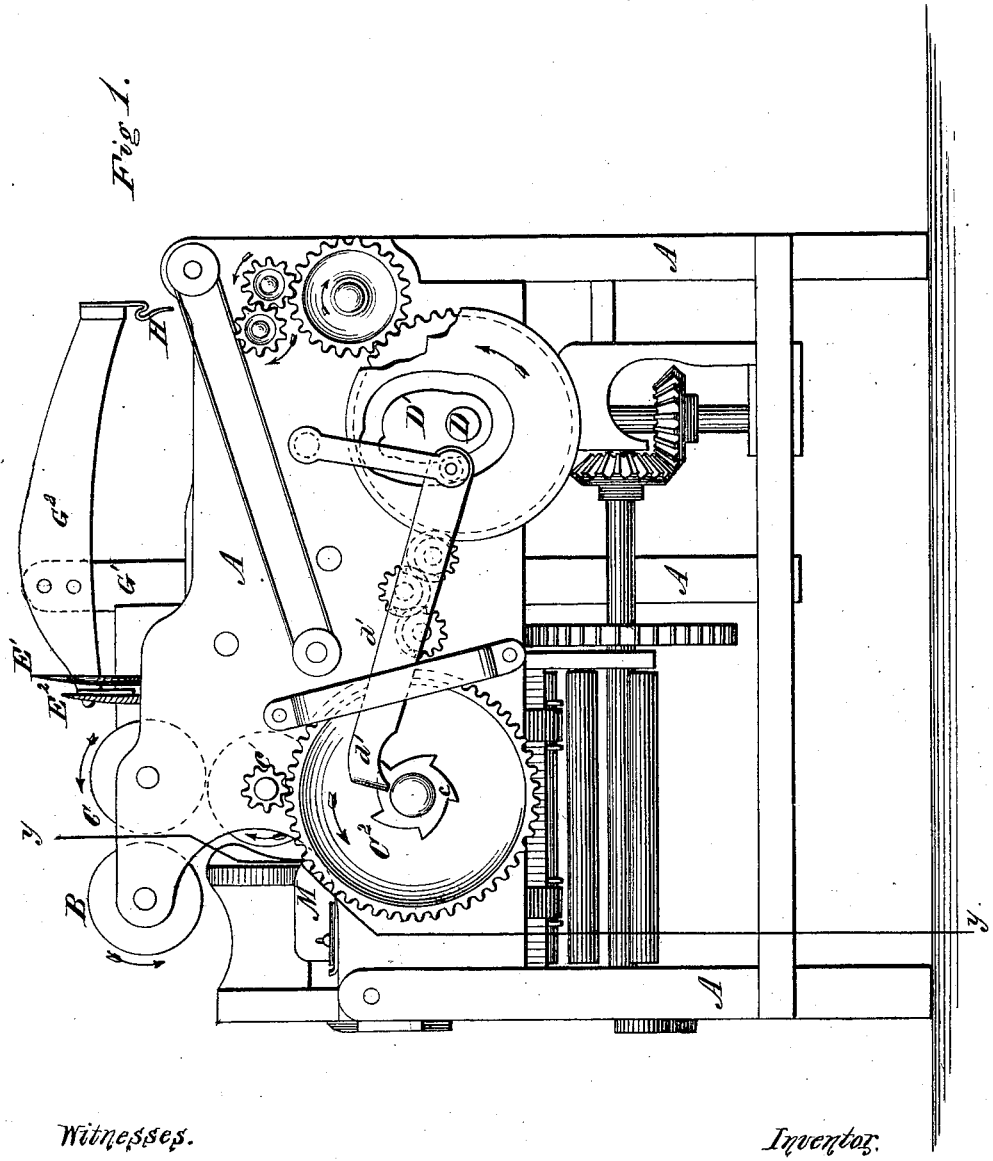
Witnesses.
Harry King.
Jas. S. Peyton.
Inventor.
Thomas W. Grinter
by his Attorney
W. D. Baldwin T. W. GRINTER.
Paper-Bag Machine.
No. 164,548.  Patented June 15, 1875.
6 Sheets--Sheet 2.
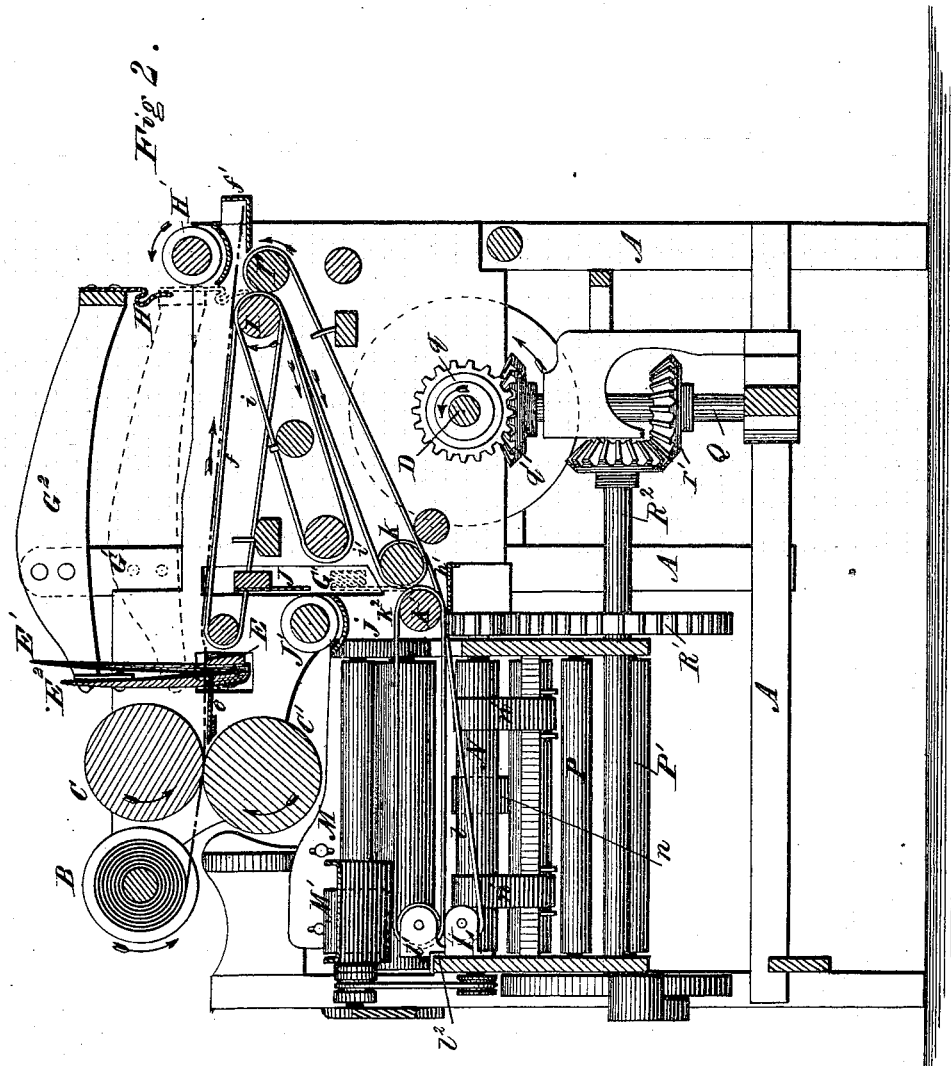
Witnesses.  
Harry King.  
Joe S. Peyton.
Inventor.  
Thomas W. Grinter  
by his Attorney  
Wm. D. Baldwin 6 Sheets--Sheet 3.
T. W. GRINTER.
Paper-Bag Machine.
No. 164,548.                    Patented June 15, 1875.
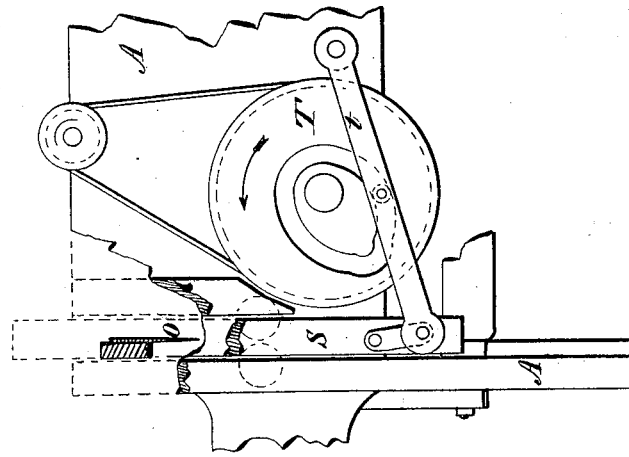
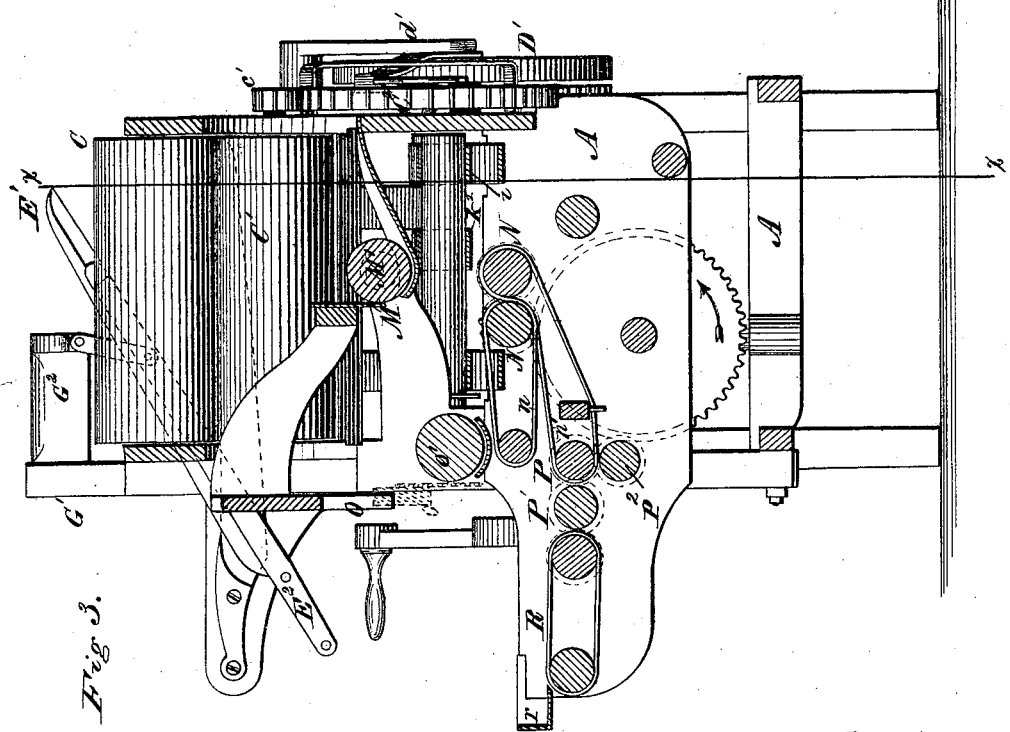
Witnesses.           Inventor.
Harry King           Thomas W. Grinter
Joe S. Payton        by his Attorney
                     Wm D. Baldwin
THE GRAPHIC CO.PHOTO-LITH.39 & 41 PARK PLACE,N.Y.

T. W. GRINTER.
Paper-Bag Machine.

No. 164,548.

6 Sheets--Sheet 4.

Patented June 15, 1875.

Witnesses.
Harry King
Jos. S. Peyton

Inventor.
Thomas W. Grinter
by his Attorney
Wm. D. Baldwin

6 Sheets--Sheet 5.
T. W. GRINTER.
Paper-Bag Machine.
No. 164,548. Patented June 15, 1875.
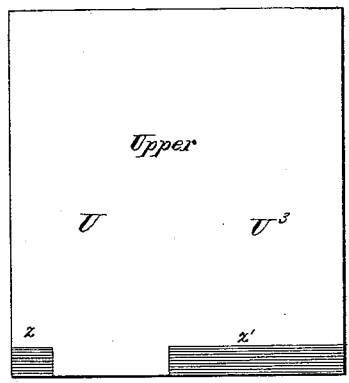
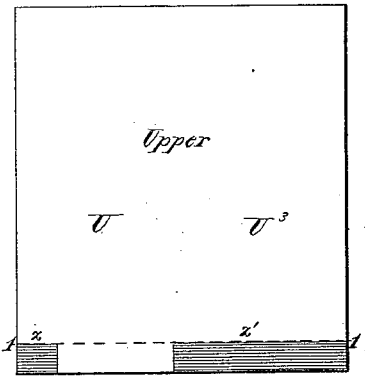
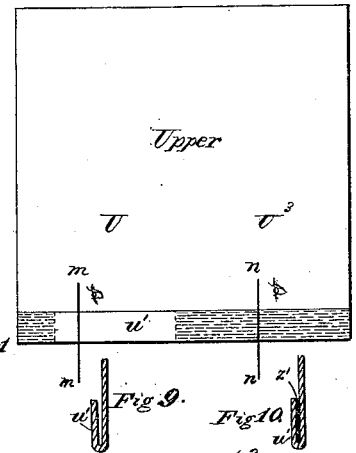
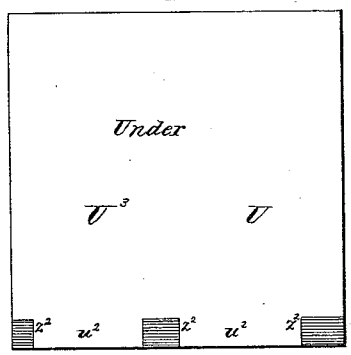
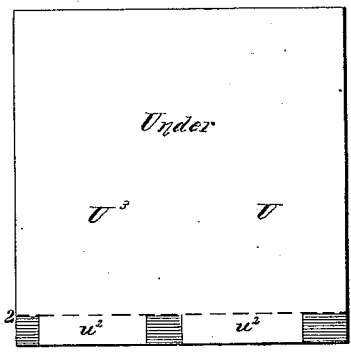
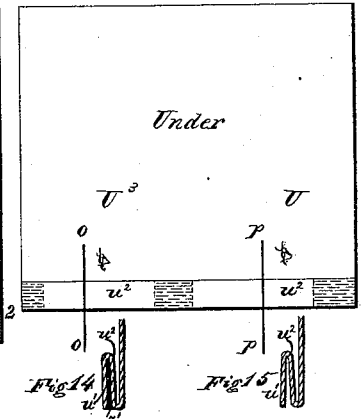
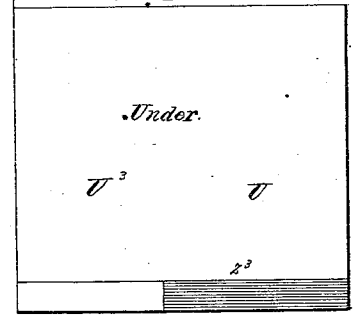
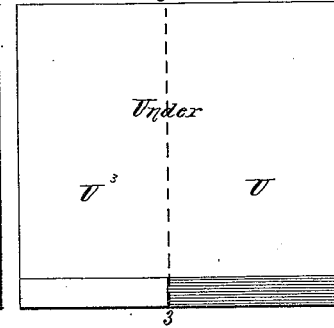
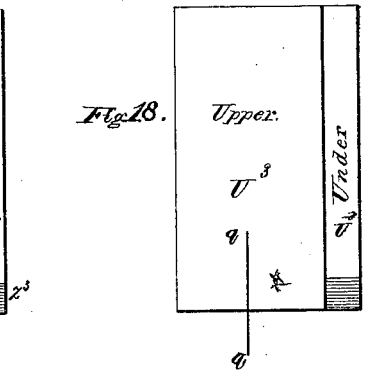
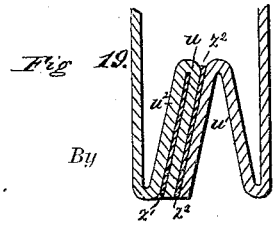
WITNESSES
Harry King
Ele Davidson
INVENTOR
Thomas W. Grinter
By W. D. Baldwin
his Attorney
THE GRAPHIC CO. PHOTO-LITH. 39 & 41 PARK PLACE, N.Y.

T. W. GRINTER.
Paper-Bag Machine.

No. 164,548.

6 Sheets--Sheet 6.

Patented June 15, 1875.

WITNESSES
Harry King.
C. C. Davidson,

Thomas W. Grinter INVENTOR
By Wm D. Baldwin
his Attorney

UNITED STATES PATENT OFFICE.

THOMAS W. GRINTER, OF CINCINNATI, OHIO, ASSIGNOR TO HIMSELF AND JOSEPH F. JEWETT, OF SAME PLACE.

IMPROVEMENT IN PAPER-BAG MACHINES.

Specification forming part of Letters Patent No. 164,548, dated June 15, 1875; application filed February 23, 1874.

CASE A.

*To all whom it may concern:*

Be it known that I, THOMAS W. GRINTER, of Cincinnati, in the county of Hamilton and State of Ohio, have invented a new and useful Improvement in Paper-Bag Machines, of which the following is a specification:

My invention contemplates the continuous manufacture of a satchel-bottom paper-bag by automatic mechanism, by a series of manipulations, during which a strip of paper is fed into the machine, cut into lengths adapted to the size of the bag to be made, has a series of folds successively formed in it, said folds being pasted simultaneously with their formation, pressed, and delivered from the machine in a completed state.

The mechanism is adapted to the formation of a satchel-bottomed bag having both a side and bottom fold or seam. This bag, however, is claimed in a separate application for Letters Patent filed simultaneously herewith, and therefore, although herein shown and described for the purpose of illustrating the operation of the machine, is not herein claimed. The subject-matter of this application will be hereinafter specifically designated.

The accompanying drawings exemplify the best way now known to me of carrying out the objects of my invention. Obviously, however, some of the improvements therein shown and herein described may be used without the others, and in machines differing in construction and operation from the one herein shown. The details of construction of the devices shown may also be varied in various well-known ways by the mere skill of the workman without departing from the spirit of my invention.

Figure 20:
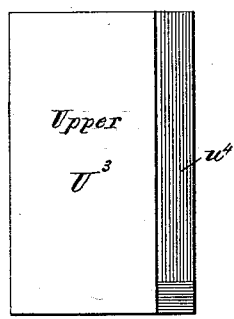
Figure 21:
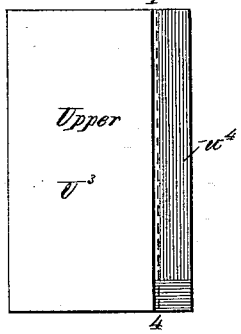
Figure 22:
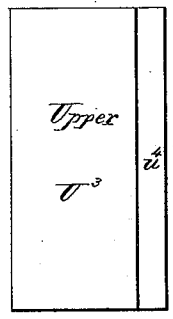
Figure 23:
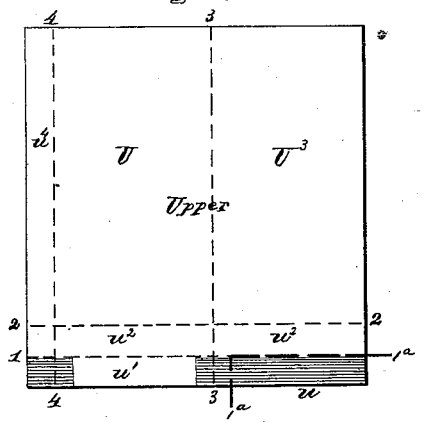
Figure 24:
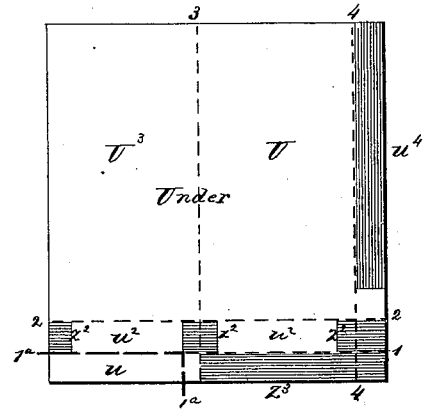

Figure 1 represents a view, in elevation, of the right side of so much of a machine embodying my improvements as is necessary to illustrate the invention herein claimed, with its parts in the relative attitude they assume while the blank is being severed from the web and the first fold formed. Fig. 2 represents a vertical longitudinal section through the same on the line $x\ x$ of Fig. 3. Fig. 3 represents a similar transverse section on the line $y\ y$ of Fig. 1. Fig. 4 represents an end view of a portion of the machine with parts broken away, showing the details of a portion of the mechanism which actuates the final folders and pasters. Fig. 5 represents a side view of a portion of the left side of the machine, illustrating the details of the mechanism which actuates and carries the cutting and first folding and pasting mechanism. Figs. 6 to 25, both inclusive, represent a bag such as my machine is adapted to produce, having a seam at bottom, in various stages of completion. The continuous dark lines of shading show where the paste is applied on the side next the spectator. The broken shading represents the paste as seen through the paper—that is, as applied on the side opposite the spectator. The single continuous lines show the edges of the folds, and the single broken lines indicate the creases. Fig. 6 represents the upper side of the blank (which ultimately forms the outer side of the completed bag) as it lies in the machine after being cut, showing the points at which the paste is first applied. Fig. 7 is a similar view of the same, showing the first crease and the pasting. Fig. 8 is a like view, showing the first fold turned back upon the upper surface of the blank as it is done by the machine. Fig. 9 is a section through this first fold on the line $m\ m$ of Fig. 8; and Fig. 10 is a similar one on the line $n\ n$ of said figure, the eye in Fig. 8 showing the direction in which the spectator is supposed to be looking. Fig. 11 represents the under side of the blank (which ultimately forms the inner side of the bag) after the first fold is turned back on the upper or opposite side, as in Fig. 8, and shows the points at which paste is applied on the second fold. Fig. 12 represents a similar view of the same, but also shows the second crease. Fig. 13 is a like view with the second fold turned back upon the under or inner side of the blank. Figs. 14 and 15, respectively, represent sections on the lines $o\ o$ and $p\ p$ of Fig. 13, similar to those shown in Figs. 9 and 10. Fig. 16 represents a view of the under side of the blank, showing the mode in which the third pasting is applied to the under or inner side of the first fold after the second fold has been made. Fig. 17 is a like view, showing the third crease, the first longitudinal one. Fig. 18 shows the main flap as it is formed by the third creaser. Fig. 19 represents a section therethrough on the line $q\,q$ of Fig. 18, showing the folds of the satchel-bottom. Fig. 20 shows the manner in which the edge flap is pasted. Fig. 21 shows the final crease, and Fig. 22 represents the completed bag. Fig. 23 is a diagram of the upper or outer side of the blank, showing the lines of the creases and the pasting, and Fig. 24 is a similar view of the under side of the blank.

For the purposes of this specification I designate that end of the machine into which the paper is fed the front, and the opposite end the back, of the machine. That side of the machine on the right-hand side of a person standing in front of the machine and facing it I call the right side; the opposite side the left. The arrows in the drawings designate the direction of the movement of the respective parts upon which they are affixed. The mechanism is mounted in a strong frame, A, of suitable form, dimension, and material. The paper from which the blanks are to be cut is, by preference, wound in the form of a web or continuous strip upon a spool, B, mounted upon some proper portion of the frame, and provided, if deemed expedient, with a retarding-brake to prevent the web from running off too rapidly. The paper from the spool passes between two feed-rolls, C C', the upper one of which, by preference, turns by frictional contact merely with the lower one C', which is positively driven. My method of manufacture is one in which a series of four bags are being simultaneously formed— each bag being in a separate stage of completion—from separate blanks fed continuously and successively from one set of mechanism to another, while the operations of pasting, folding, and pressing appropriate to the particular stage are being performed, the folding and pasting mechanisms acting intermittently. My machine is organized with reference to this series of manipulations. I therefore prefer to actuate the mechanism by means of a driving-shaft, D, to which continuous rotary motion is imparted from any suitable prime mover, which shaft projects on both sides of the frame. A cam-wheel, D', on the right side of the machine reciprocates a jointed swinging pawl, $d'$, which acts upon a ratchet-wheel, $c$, on a gear-wheel, $C^2$, which, in turn, drives a pinion, $c'$, on the lower feed-roll $C^1$, thus giving it a positive intermittent motion, to enable it to feed the blank to the cutters at proper intervals. The paper passes from the feed-rolls over bridge-springs or spring-guides $e$, occupying the space between the rolls and a fixed shear-blade, E, over which the paper passes to an endless apron, $f$, which carries it onward until the front edge of the strip abuts against a stop, $f^1$, on the frame. This stop is made adjustable, in any well-known way, to regulate the width of the bottom fold, and consequently the width of the satchel-bottom.

Side gages, adjustable to suit various widths of bags, may also be used in the machine, but the construction of such gages being common, it is deemed unnecessary here to show and describe them. The cam-wheel D is of such contour that when a sufficient length of paper to form a blank of proper size has been fed past the shears the pawl $d'$ is retracted and the feed stops. A cam-wheel, G, on the left end of the driving-shaft D, vibrates a link-rod, $g$, jointed to a slide-bar, $G^1$, which reciprocates vertically in suitable guides on the frame and carries a cross-head, $G^2$. The movable blade $E^1$ of the shear or cutter is attached to this cross-head by a link, $e'$, as is, also, the first paster and creaser or folder. In this instance the movable blade E' of the shear is pivoted on a bracket projecting from the frame, so as to vibrate across the stationary blade E, exactly as shears cut. A reciprocating or sliding cutter might, however, be used, if preferred. A supplementary blade, holding-clamp, or bearer, $E^2$, attached to or moving in unison with the moving cutter descends upon the web of paper in front of the blade and clamps it upon the bridge-springs $e$ while the blanks are being severed, thus preventing the end of the web from flying up or becoming displaced. The feed-motion, as before remarked, ceases while the blank is being cut, but recommences as soon as the movable shear-blade and holding-clamp have risen enough to allow the paper to pass on.

Simultaneously with the severance of the blank from the web the first creaser H descends upon the blank near its most advanced edge, and makes the crease shown by the dotted line 1 in Fig. 7. As this creaser descends upon the blank it rubs against a paste-roller, H', rotating in a trough, and paste is applied to those portions of the knife opposite that part of the blank shown in shaded lines, and marked $z\,z^1$, in Figs. 6 and 7. That portion $u$ of the blank included by the heavy broken line of Fig. 23, and the correspondingly-lettered white part of Fig. 24, may be cut out if desired, instead of being pasted, as shown, as it is ultimately pasted on both sides, and forms a superfluous fold in the bottom of the bag. (See Fig. 19.) The creaser carries the front end of the blank, thus creased and pasted, down between two pressing-rollers, I I', over which endless tapes $i\,i^1$ pass. (See Fig. 2.) The rollers press the doubled-back fold $u^1$ upon the upper surface of the blank, causing its pasted surface to adhere thereto, (see Figs. 8, 9, and 10,) while the tapes $i\,i^1$ carry forward the blank, now turned upside down, so that what was originally the upper surface of the web now becomes the lower. The first fold $u^1$ is brought underneath the blank by this reversal. These tapes carry the partially-folded blanks forward until its front edge abuts against a stop, $j$, at which moment a second creaser, J, descends upon the blank just back of the turned-back edge of the first fold $u^1$, and on the opposite side of the blank, and carries it down between a second set of pressing-rollers, K K$^1$, and their endless tapes $i^1$ $k^2$, thus forming the crease 2 2 of Figs. 12, 23, and 24, and turning back the second fold $u^2$ upon the main part of what was originally the under, but has now become the upper, side of the blank. (See Figs. 13, 14, and 15.) As the creaser descends it rubs over a second paste-roller, J$^1$, which is, in fact, composed of three rollers on a single shaft. These rollers paste the blank at the points marked $z^2$ on Figs. 11, 12, and 13. This paste-roller may be driven from any suitable portion of the gearing. The creaser itself is mounted upon and actuated by the reciprocating slide G$^1$, which carries the moving shear and first creaser, as hereinbefore described.

The blank now passes between the tapes K$^2$ above mentioned, and another set, $l$, encircling rollers L and $l^1$, and passing under the roller K$^1$, and is carried forward until it abuts against another stop, $l^2$, which is, in fact, the front inner edge of the frame. At this moment a third creaser or folding knife, M, arranged lengthwise of the machine, and consequently at right angles to the other folders hereinbefore mentioned, descends upon the blank and forms the central longitudinal crease 3 3 of Figs. 17, 23, and 24, and turns the flap $u^3$. (See Fig. 18.) In its descent this creaser rubs over a paste-roller, M$^1$, which supplies paste to the creaser to paste that portion of the blank marked $z^3$, which is, in fact, part of the under side or back of the first flap $u^1$. (See Fig. 19.) This paste-roller is driven in any suitable manner. The manner in which the knife is driven will be hereinafter described.

The third folding-knife M forces the blank down to two pressing-rollers, N N$^1$, the tapes $n$ $n$ of which draw the blank down with its edge in contact with the knife, to receive the paste $z^3$, and carry the now longitudinally-folded blank sidewise beneath a fourth or side creasing-blade, O, which slides past a pasting-roller, $o^1$, descends upon the blank near the edge, and creases the blank on the line 4 4, at the same time pasting the side flap $u^4$, and pressing the blank down between two rollers, P P$^1$, from which it drops a completed bag. (See Figs. 20, 21, and 22.) Before the final fold is made, however, the bag runs out on endless tapes R until it abuts against a stop, $r$, which regulates the width of the bag. The roller P$^2$ prevents the completed bag from being drawn into the machinery.

The pasting knives or creasers may have bristles, cloth, or some analogous substance applied to their edges, to enable them more readily to take up and carry the paste to the blanks.

The third and fourth creasing-knives M and O are in this instance both mounted on a reciprocating slide, S, driven by a rotating cam-wheel, T, and oscillating pivoted link $t$, as the cutter and first and second creasers are driven; and the motions of these parts are so timed that the cutter and first and second creaser operate simultaneously, while the third and fourth creasers act in unison, but during the pauses of the other set, thus equalizing the power required to drive the machine. The movements of the tapes, it will be observed, as well as those of the paste-rollers, are continuous, while those of the cutter and creasers are intermittent. Thus no time is lost, while the necessity incident to other machines of keeping all the parts in a continuous motion is avoided.

A bevel-wheel, $q$, Fig. 2, on the main shaft D drives a corresponding pinion. $q^1$, on a vertical shaft, Q. A bevel-gear wheel, $r^1$, on this shaft drives a corresponding pinion on a shaft, R$^2$, on the front end of which a cam-wheel, S, is mounted. A link-rod, $s$, connects this cam with a slide-bar, $s^1$, on which the third and fourth creasing-knives M O are mounted. A spur-wheel, T, on the main shaft D, drives an idle-wheel, T$^1$, which drives a pinion, $t$, on the roller I$^1$, which carries tapes $i^1$. This pinion in turn drives a corresponding one on the roller I, over which the feed-tapes $f$ run. The rollers $k$ $k^1$ are driven by a set of gears, $t^2$ $t^3$ $t^4$, on the opposite side of the wheel T. (See Figs. 1 and 2.)

The third and fourth sets of tapes and rollers N N$^1$ N$^2$ P P$^1$ P$^2$ are driven by suitable gears from a large spur-wheel, R$^1$, on the shaft R$^2$. The various paste-rollers are driven by belts from some of the various shafts and rollers above mentioned; but these details, obviously, may be varied to suit the desires of the workman.

The tapes are kept in their proper places by suitable guide-pins $v$ on some fixed part of the machine.

The operation of my improved machine, and its mode of forming a bag, will readily be understood from the foregoing description.

The bottom of the bag consists of six plies or thicknesses, as shown in Fig. 19. Of these a portion of the first fold, as before remarked, is superfluous, and may be cut away from the blank in well-known ways in forming the bag. The bag may also be turned in at the bottom corner, as shown in Fig. 25, either automatically or by hand.

It will be observed from the foregoing description that by my invention a blank is cut from a web of paper, folded, pasted, and discharged completely finished without the use of a former, or of folding leaves or tables, by successive repetitions of a series of operations, each like the others, which I believe no other machine has heretofore done.

I claim as of my invention—

1. The combination, substantially as set forth, of intermittently-moving feed-rolls, a fixed cutter, a movable cutter, a holding-clamp or bearer moving with said movable cutter, and bridge-springs interposed between the roller and cutters, whereby the paper web, while being cut, is clamped upon the springs and its front end presented in proper relation to the carrying-apron when the feed is resumed.

2. The combination, substantially as set forth, of feed-rollers holding-clamps, cutters, and a pasting and creasing knife, all moving intermittently, with continuously and rapidly moving feed-tapes and pressing-rollers, whereby each blank, after being severed from the web, gains on the following one the distance necessary for the proper performance of the succeeding operation.

3. The combination of feed-rollers, cutters, and first and second pasters and creasers, all moving intermittently, with continuously-moving carrying-tapes and pressing-rollers, these members being constructed to operate in combination, substantially as set forth, whereby the blank is pasted on one side, folded, reversed, and then pasted on the opposite side of its bottom folds.

4. The combination of the cam-wheel G, its slide-bar and cross-head, the movable cutter, the first and second creasers and pasters, and their paste-applying rollers, these members being constructed and operating substantially as set forth.

5. The combination, substantially as set forth, of the first and second creasers and pasters, forming the bottom folds of the bag, and their carrying-tapes and pressing-rolls, with the third creaser and paster, and its carrying-tapes and pressing-rollers, whereby the bottom is twice pasted at proper points, twice folded upon the body, again pasted, and the body folded longitudinally.

6. The combination of the third and fourth creasers and pasters, mounted upon a common support, and actuated by a single cam, and the paste-rollers $M$ $O^1$, substantially as set forth.

7. The combination of the first and second creasers and pasters, operating in parallel planes, with the third and fourth creasers and pasters, likewise operating in parallel planes transverse to and during the pause in the movement of the first two, these members being constructed and operating substantially as set forth.

8. The combination, substantially as set forth, of a cutter and two creasers, moving in parallel planes, and operating simultaneously, with creasers moving transversely thereto, and acting in unison during the pause in the operation of the cutter and first creaser, whereby a series of blanks are simultaneously subjected to successive stages of manipulation, as set forth.

In testimony whereof I have hereunto subscribed my name.

THOMAS W. GRINTER.

Witnesses:
GEO. E. JEWETT,
JAMES M. KELLEY.